(12) United States Patent
Peng (10) Patent No.: US 7,991,708 B2
(45) Date of Patent: Aug. 2, 2011

(54) PERSONALIZED DELIVERY PAYMENT CODING

(75) Inventor: Joseph Y. Peng, Rockville, MD (US)

(73) Assignee: United States Postal Service, Washington, DC (US)

(*) Notice: Subject to any disclaimer, the term of this patent is extended or adjusted under 35 U.S.C. 154(b) by 373 days.

(21) Appl. No.: 11/761,293

(22) Filed: Jun. 11, 2007

(65) Prior Publication Data

US 2007/0294193 A1 Dec. 20, 2007

Related U.S. Application Data

(63) Continuation of application No. 10/450,136, filed as application No. PCT/US01/47721 on Dec. 17, 2001, now abandoned.

(60) Provisional application No. 60/255,425, filed on Dec. 15, 2000.

(51) Int. Cl.
G06F 17/00 (2006.01)
G01B 7/00 (2006.01)
(52) U.S. Cl. ......... 705/408; 702/155; 700/232; 700/233
(58) Field of Classification Search .................. 705/408; 700/232–233; 702/155
See application file for complete search history.

(56) References Cited

U.S. PATENT DOCUMENTS

| | | | |
|---|---|---|---|
| 4,725,718 A | 2/1988 | Sansone et al. | |
| 4,831,555 A | 5/1989 | Sansone et al. | |
| 5,490,077 A | 2/1996 | Freytag | |
| 5,666,215 A | 9/1997 | Fredlund | |
| 5,717,597 A * | 2/1998 | Kara | 705/408 |
| 5,819,240 A | 10/1998 | Kara | |
| 5,852,813 A | 12/1998 | Guenther et al. | |
| 5,873,605 A | 2/1999 | Kaplan | |
| 5,923,406 A * | 7/1999 | Brasington et al. | 355/40 |
| 6,085,126 A * | 7/2000 | Mellgren et al. | 700/233 |
| 6,438,509 B1 * | 8/2002 | Hayama et al. | 702/155 |
| 6,842,533 B1 * | 1/2005 | Patton et al. | 382/115 |
| 6,972,859 B1 | 12/2005 | Patton et al. | |
| 7,080,041 B2 * | 7/2006 | Nagel | 705/51 |
| 7,194,957 B1 * | 3/2007 | Leon et al. | 101/485 |
| 7,337,130 B2 * | 2/2008 | Ito et al. | 705/26 |
| 2002/0033598 A1 | 3/2002 | Beasley | |
| 2003/0140017 A1 * | 7/2003 | Patton et al. | 705/410 |
| 2004/0045203 A1 * | 3/2004 | Patton et al. | 40/638 |
| 2005/0225799 A1 * | 10/2005 | Berarducci et al. | 358/1.15 |
| 2008/0133411 A1 * | 6/2008 | Jones et al. | 705/42 |

FOREIGN PATENT DOCUMENTS

EP 0893787 A3 1/1999

OTHER PUBLICATIONS

Stephens, G., "Australia to Personalize New Stamps With Photographs of Show Visitors," Linn's Stamp News [on line], Mar. 22, 1999. (Retrieved on May 3, 2002 from www.lins.com/print/archives/20000403/news3.asp). (3 pages).
International Search Report completed May 2, 2002, for Int'l Appl. No. PCT/US01/47721, filed Dec. 17, 2001 (4 pages).

* cited by examiner

*Primary Examiner* — Fadey S Jabr (74) *Attorney, Agent, or Firm* — Finnegan, Henderson, Farabow, Garrett & Dunner, LLP (57) ABSTRACT

A method and system for creating a personalized delivery payment coding includes selecting from a set of designs for delivery payment coding, calculating an appropriate fee, paying an appropriate fee, and printing a selected design on delivery payment coding product paper.

21 Claims, 7 Drawing Sheets

PERSONALIZED DELIVERY PAYMENT CODING

RELATED APPLICATION

This application is a continuation of application Ser. No. 10/450,136, filed Jun. 12, 2003, now abandoned which is a national stage filing under 35 U.S.C. §371 of PCT Application No. PCT/US01/47721 filed Dec. 17, 2001, which claimed the benefit of U.S. provisional application No. 60/255,425, filed Dec. 15, 2000, all of which are expressly incorporated herein by reference.

TECHNICAL FIELD

The present invention relates to the field of providing delivery payment coding. More particularly, the present invention, in various specific embodiments, involves methods and systems directed to providing personalized delivery payment coding within an item delivery system.

BACKGROUND

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving packages. In an effort to lower operating costs and increase value for their customer base, many delivery system operators attempt to create value for their present customers by creating valued-added services. In addition, value-added service can tend to add new customers as well. Delivery system operator may realize an increase in profitability due to the increased revenue created by value added services.

Therefore, there is a need for the United States Postal Service and many other organizations to efficiently provide value added services to their customer base. More specifically, delivery system operators desire to efficiently provide personalized delivery payment coding within the item delivery system. This is because in an increasingly competitive environment, it is essential for a service provider to reduce costs and exceed the expectations of those who receive a service.

SUMMARY OF THE INVENTION

In one aspect, a method for creating a personalized delivery payment coding includes selecting from a set of designs for the delivery payment coding, calculating an appropriate fee, paying an appropriate fee, and printing a selected design on delivery payment coding product paper.

In another aspect, a system for creating a personalized delivery payment coding includes a component for selecting from a set of designs for the delivery payment coding, a component for calculating an appropriate fee, a component for paying an appropriate fee, and a component for printing a selected design on delivery payment coding product paper.

In yet another aspect, a computer-readable medium on which is stored a set of instructions for creating a personalized delivery payment coding, which when executed perform stages including selecting from a set of designs for the delivery payment coding, calculating an appropriate fee, paying an appropriate fee, and printing a selected design on delivery payment coding product paper.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Reference will now be made to various embodiments consistent with this invention, examples of which are shown in the accompanying drawings and will be obvious from the description of the invention. In the drawings, the same reference numbers represent the same or similar elements in the different drawings whenever possible.

Exemplary Item Delivery System

Figure 1:
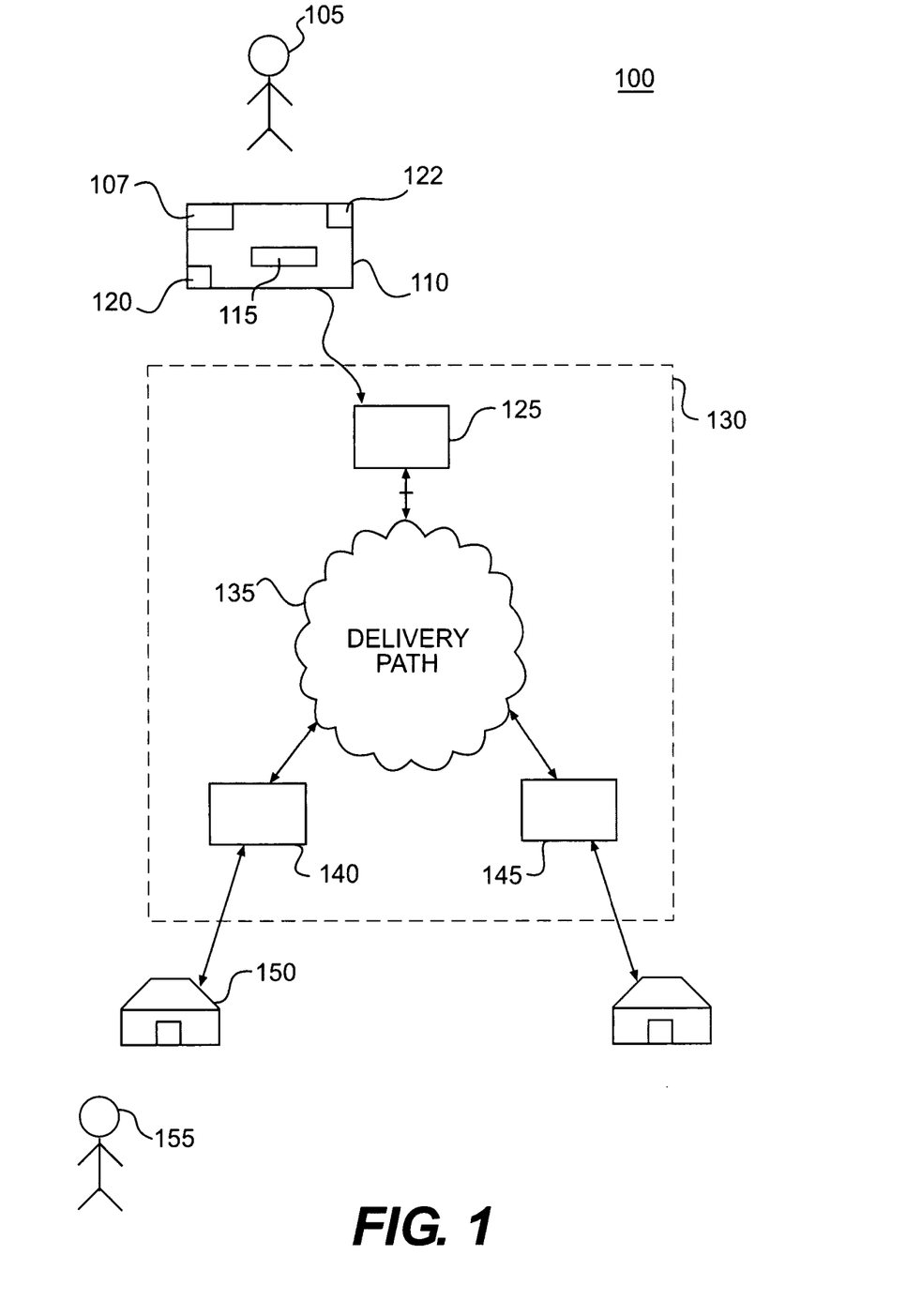
FIG. 1 is a functional block diagram of a system for providing item delivery service consistent with the present invention.

FIG. 1 shows an exemplary item delivery system 100 that may be used in conjunction with the present invention. Within item delivery system 100, for example, an item 110 may be prepared manually by a user 105 or may be prepared utilizing an inserter under the supervision of user 105. An inserter is an automated device capable of assembling item 110 which may comprise flat mail, catalogs, magazines, mailpieces, United States Postal Service Priority Mail package, or a United States Postal Service Express Mail package. While item 110 may comprise any of the aforementioned, those skilled in the art will appreciate that still many other types of items may be utilized.

In exemplary item delivery system 100, materials are placed in item 110 that user 105 wishes to send to a recipient 155. With the materials placed in item 110, an address label 115 is placed on item 110 indicating a first address 150 of a recipient 155 and a return address 107 indicating where to return item 110, if necessary, are placed on item 110. In addition, a tracking indicia 120 is placed on item 110 along with a delivery payment coding 122. Tracking indicia 120 is utilized by a delivery system operator to facilitate the delivery of item 110. The use of tracking indicia 120 will be discussed in greater detail below. Delivery payment coding 122 indicates the payment amount user 105 believes is required by the delivery system operator to deliver item 110 to recipient 155. Delivery payment coding 122 may comprise a bar code, an image indicating an account from which delivery payment has been made, a postage stamp, or other types of codings as are known by those skilled in the art.

Tracking indicia 120 may comprise a bar code, a PLANET code or other types of indicia as are known by those skilled in the art. A bar code is a printed symbol used for recognition by a bar code scanner (reader). Traditional one-dimensional bar codes use the bar's width to encode a product or account number. Two-dimensional bar codes, such as PDF417, MAXICODE and DATAMATRIX, are scanned horizontally and vertically and hold considerably more data. Generally, PDF417 is widely used for general purposes, MAXICODE is used for high-speed sorting, and DATAMATRIX is used for marking small parts.

Historically, some delivery system operators sorted flat mail using POSTNET, a 12-digit barcode developed by the USPS consisting of alternating long and short bars indicating the destination of, for example, a mailpiece. Responding to the expanding needs of users, particularly heavy volume users, the PLANET code was developed on the foundation of the existing technical infrastructure. The PLANET Code is, in one respect, the opposite of the current POSTNET codes, reversing long bars for short and short bars for long. This innovation offers the convenience of a bar code that is easily applied using current bar-coding methods, and is readily scanned by the high-speed automation equipment already located in the plurality of plants comprising a delivery system 130 as discussed below.

In sending item 110, for example, user 105 places item 110 into a delivery system 130 at a sender plant 125. Item 110 is routed through delivery system 130 comprising sender plant 125, a delivery path 135, a first address plant 140, and a second address plant 145. Delivery path 135 comprises a plurality of plants similar to sender plant 125, first address plant 140, and second address plant 145. The plants within delivery system 130 contain, among other things, automated systems and sorting equipment and are designed to receive and process a plurality of items. Delivery system 130 is configured to sense tracking indicia 120 placed on item 110 as it passes through the elements of delivery system 130 directing the movement of item 110 through delivery system 130. Tracking indicia 120 sensed by delivery system 130 may comprise a bar code, a PLANET code, or other indicia as described herein above.

In the delivery process, item 110 is routed to the next most appropriate plant in delivery system 130. The appropriateness of the next plant in delivery system 130 depends upon the present location of the particular item in delivery system 130 and where item 110 is addressed. Ultimately, item 110 is routed in delivery system 135 to the plant that serves the delivery address indicated on item 110, according to established procedures. Thus, item 110 is routed from plant to plant within delivery system 130 wherein item 110 efficiently converges on the plant that serves the delivery address indicated on the item, in this case, first address plant 140. Throughout this process, delivery system 130 tracks the progress of items 110 through delivery system 130.

System for Creating a Personalized Delivery Payment Coding

Consistent with the general principles of the present invention, a system for creating a personalized delivery payment coding comprises a component for selecting from a set of designs for the delivery payment coding, a component for calculating an appropriate fee, a component for paying the appropriate fee, and a component for printing a selected design on delivery payment coding product paper.

Figure 2:
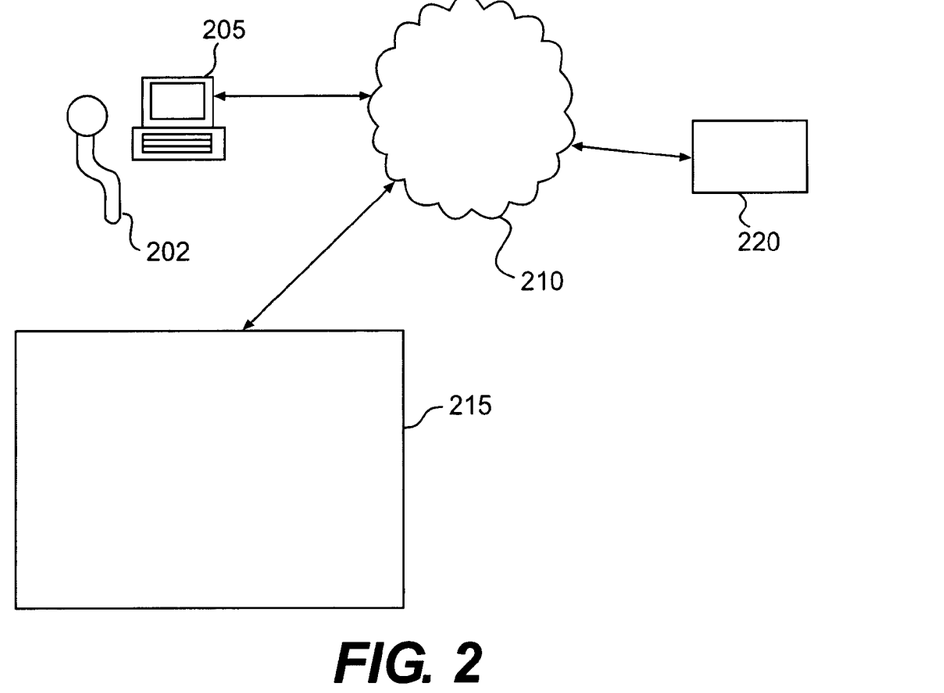
FIG. 2 is a functional block diagram of a system for creating a personalized delivery payment coding consistent with the present invention.

As herein embodied and illustrated in FIG. 2, a personalized delivery payment coding system 200 comprises a user computer 205, a network 210, a delivery system server 215, and a licensee server 220. In the exemplary embodiment of FIG. 2, for example, any of the component for selecting from a set of designs for the delivery payment coding, the component for calculating an appropriate fee, the component for paying the appropriate fee, and the component for printing a selected design on delivery payment coding product paper may be embodied in the user computer 205, the delivery system server 215, the licensee server 220, or any combination thereof.

User computer 205 may comprise a personal computer or other similar microcomputer-based workstation. Those skilled in the art, however, will appreciate that user computer 205 may comprise any type of computer operating environment such as hand-held devices, multiprocessor systems, microprocessor-based or programmable consumer electronics, minicomputers, mainframe computers, and the like. User computer 205 may also be practiced in distributed computing environments where tasks are performed by remote processing devices. Furthermore, user computer 205 may comprise a mobile terminal such as a smart phone, personal digital assistant (PDA), intelligent pager, portable computer, or a hand held computer. A PDA is a handheld computer that serves as an organizer for personal information. It generally includes at least a name and address database, to-do list and note taker. PDAs are typically pen-based and use a stylus ("pen") to tap selections on menus and to enter printed characters. The unit may also include a small on-screen keyboard which is tapped with the pen. Data may be synchronized between the PDA and a desktop computer through a cable or wireless transmissions.

User computer 205 may be located in a home, office, store, a delivery system operator office such as the United States Postal Service Post Office, a location of a licensee of a delivery system operator, a retail center kiosk, or any location wherein it may be operated. Moreover, user computer 205 may be operated by a user 202 that may comprise a subject receiving the personalized delivery payment coding, a technician, or any other advisor. Those skilled in the art will appreciate that user computer 205 may be located at a variety of places and operated by a variety of people.

Network 210 may comprise, for example, a local area network (LAN) or a wide area network (WAN). Such networking environments are commonplace in offices, enterprise-wide computer networks, intranets, and the Internet and are known by those skilled in the art. When a LAN is used as network 210, user computer 205 and elements of delivery system server 215 are connected to network 210 through a network interface located at each of the respective user computer 205 and elements of delivery system server 215. When a WAN networking environment is utilized as network 210, user computer 205 and elements of delivery system server 215 typically include an internal or external modem (not shown) or other means for establishing communications over the WAN, such as the Internet.

In addition to utilizing a wire line communications system as network 210, a wireless communications system, or a combination of wire line and wireless may be utilized as network 210 in order to, for example, exchange web pages via the internet, exchange e-mails via the Internet, or for utilizing other communications media. Wireless can be defined as radio transmission via the airwaves, however, those skilled in the art will appreciate that various other communication techniques can be used to provide wireless transmission including infrared line of sight, cellular, microwave, satellite, packet radio and spread spectrum radio. User computer 205 and elements of delivery system server 215 in the wireless environment can be any mobile terminal such as a smart phone, personal digital assistant (PDA), intelligent pager, portable computer, hand held computer, or any device capable of receiving wireless data. Wireless data may include, but is not limited to, paging, text messaging, e-mail, Internet access and other specialized data applications specifically excluding voice transmission.

In utilizing network 210, data sent over network 210 may be encrypted to insure data security. When encrypting, the data may be converted into a secret code for transmission over a public network. The original file, or "plaintext," may be converted into a coded equivalent called "ciphertext" via an encryption algorithm executed, for example, on user computer 205 or on elements of delivery system server 215. The ciphertext is decoded (decrypted) at a receiving end and turned back into plaintext.

The encryption algorithm may use a key, which is a binary number that is typically from 40 to 128 bits in length. The greater the number of bits in the key (cipher strength), the more possible key combinations and the longer it would take to break the code. The data is encrypted, or "locked," by combining the bits in the key mathematically with the data bits. At the receiving end, the key is used to "unlock" the code and restore the original data.

There are two main cryptographic methods that may be suitable for use with personalized delivery payment coding system 200. The traditional method uses a secret key, such as the Data Encryption Standard (DES). In DES, both sender and receiver use the same key to encrypt and decrypt. This is the fastest method, but transmitting the secret key to the recipient in the first place is not secure. The second method is public-key cryptography, such as the Rivest-Shamir-Adleman (RSA) highly-secure cryptography method by RSA Data Security, Inc., Redwood City, Calif., (www.rsa.com). RSA uses a two-part concept with both a private and a public key. The private key is kept by the owner; the public key is published. Each recipient has a private key that is kept secret and a public key that is published for everyone. The sender looks up the recipient's public key and uses it to encrypt the message. The recipient uses the private key to decrypt the message. Owners never have a need to transmit their private keys to anyone in order to have their messages decrypted, thus the private keys are not in transit and are not vulnerable.

Public key cryptography software marketed under the name Pretty Good Privacy (PGP) from Pretty Good Privacy, Inc., (PGP) of San Mateo, Calif., (www.pgp.com) may be utilized in this embodiment. PGP was developed by Phil Zimmermann, founder of the company, and it is based on the RSA cryptographic method. A version for personal, non-business use is available on various Internet hosts. While PGP may be used to encrypt data transmitted over network 210, those skilled in the art will appreciate that many other types of encryption algorithms, methods and schemes may be employed.

In personalized delivery payment coding system 200, data may be transmitted by methods and processes other than, or in combination with network 210. These methods and processes may include, but are not limited to, transferring data via, diskette, CD ROM, facsimile, conventional mail, an interactive voice response system (IVR), or via voice over a publicly switched telephone network. An IVR is an automated telephone answering system that responds with a voice menu and allows the user to make choices and enter information via the telephone keypad. IVR systems are widely used in call centers as well as a replacement for human switchboard operators. An IVR system may also integrate database access and fax response.

Figure 3:
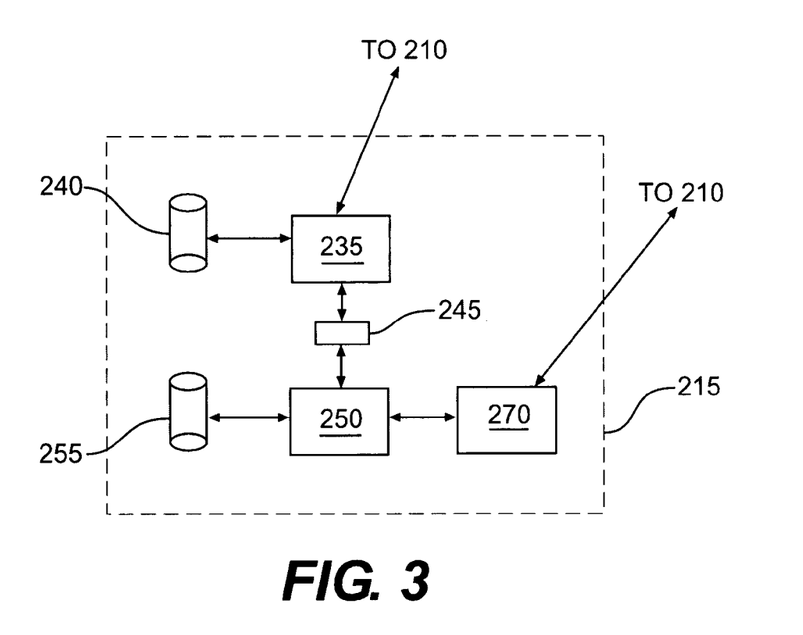
FIG. 3 is a functional block diagram of a delivery system server consistent with the present invention.

Referring to FIG. 3, delivery system server 215 comprises a first server front end 235 with its associated first server front end database 240, a first server back end 250 with its associated first server back end database 255, and a simple mail transfer protocol (SMTP) server 270. First server front end 235 is separated from first server back end 250 by a first server firewall 245. One function of first server front end 235 is to provide an interface via network 210 between user computer 205 and delivery system server 215. The function of the SMTP server 270 is to provide, for example, an e-mail interface via network 210 between user computer 205 and first server 215.

Simple Mail Transfer Protocol is a standard e-mail protocol on the Internet. It is a TCP/IP protocol that defines the message format and the message transfer agent (MTA), which stores and forwards the mail. SMTP was originally designed for only ASCII text, but MIME and other encoding methods enable program and multimedia files to be attached to e-mail messages. SMTP servers route SMTP messages throughout the Internet to a mail server, such as a Post Office Protocol 3 (POP3) or an Internet Messaging Access Protocol (IMAP) server, which provides a message store for incoming mail.

Post Office Protocol 3 (POP3) servers, using the SMTP messaging protocol, are standard mail servers commonly used on the Internet. POP3 servers provide a message store that holds incoming e-mail until users log on and download them. With POP3, all pending messages and attachments are downloaded at the same time. Internet Messaging Access Protocol (IMAP) is also a standard mail server that is widely used on the Internet. It provides a message store that holds incoming e-mail until users log on and download them. IMAP, however, is more sophisticated than the POP3 mail server. In IMAP, messages can be archived in folders, mailboxes can be shared, and a user can access multiple mail servers. There is also better integration with MIME, which is used to attach files. For example, users can read only the headers in the message without having to automatically accept and wait for unwanted attached files to download.

First server front end 235 and first server back end 250 may comprise a personal computer or other similar microcomputer-based workstations. Those skilled in the art, however, will appreciate that first server front end 235 and first server back end 250 may comprise any type of computer operating environment such as hand-held devices, multiprocessor systems, microprocessor-based or programmable consumer electronics, minicomputers, mainframe computers, and the like. First server front end 235 and first server back end 250 may also be practiced in distributed computing environments where tasks are performed by remote processing devices. First server front end 235 is preferably implemented on a Compaq Proliant 1600 server running Windows 2000 and Domino Webserver. First server back end 250 is preferably implemented on a Compaq Proliant 1600 server running NT4 and Domino Application Server. And SMTP server 270 is preferably implemented on a Compaq DL 360 running Windows 2000 and Domino SMTP Mail Server.

Other servers, such as a licensee server 220 (FIG. 2), may be included in personalized delivery payment coding system 200. Other servers used in personalized delivery payment coding system 200 may be constructed in an architecture similar to delivery system server 215 or may be constructed using other suitable architectures as are known by those skilled in the art.

Method for Creating a Personalized Delivery Payment Coding

Figure 4:
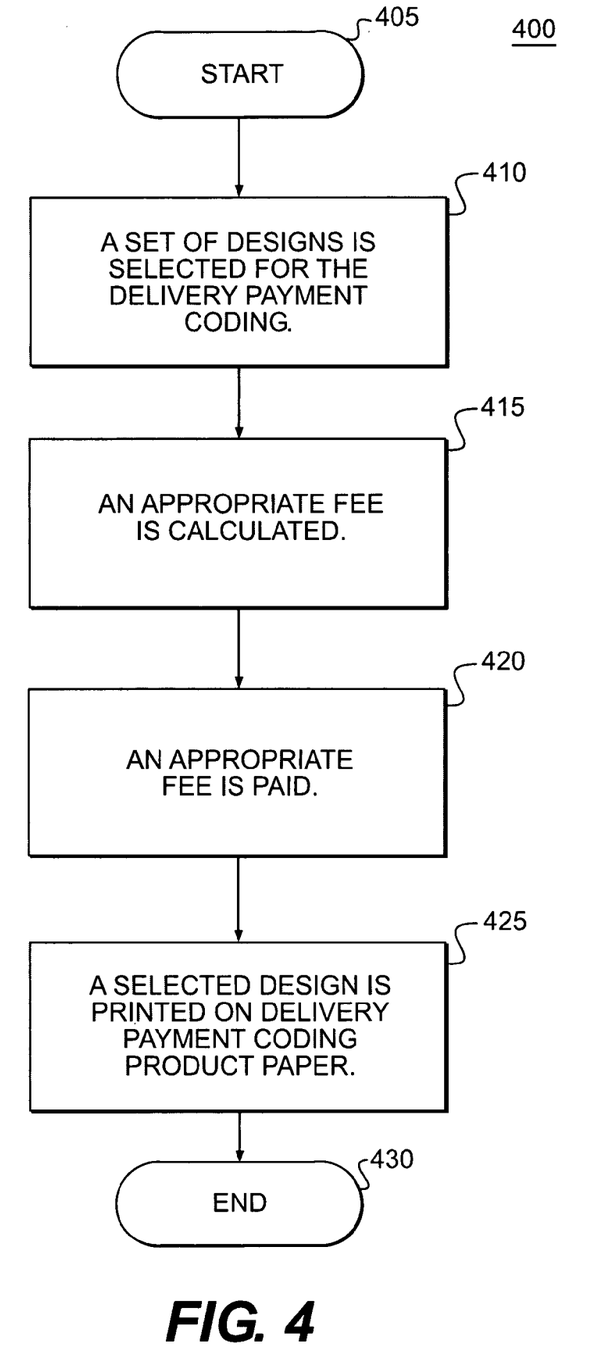
FIG. 4 is a flow chart of an exemplary method for creating a personalized delivery payment coding consistent with the present invention.

FIG. 4 is a flow chart setting forth the general stages involved in an exemplary method 400 for creating a personalized delivery payment coding. Exemplary method 400 begins at starting block 405 and proceeds to stage 410 where a set of designs is selected for the delivery payment coding.

For example, the delivery system operator may make available software to users that will enable delivery system users to select images that will appear on the personalized delivery payment coding. User 202, for example, can either select an image from a group of pre-designed and pre-approved images or may create and impute an design and have the design applied to the personalized delivery payment coding. User 202 may modify pre-designed images by lowering a user-supplied image on top of a pre-designed image. If user 202 wishes to use a personalized delivery payment coding with a user-supplied image, the user may have the design approved by the delivery system operator before is printed.

An image designed for use with a personalized delivery payment coding may be adapted for use in many different applications. It can be used for regular household use, special occasions, special events, tourist attractions, wedding announcements, family pictures, corporation logos, philatelic organizations, or other promotional uses. For example, sports teams may want to use their team logos on the personalized delivery payment coding for promotion letters, ticket sending, and all kinds of communication or advertising. Those skilled in the art will appreciate that a personalized delivery payment coding may be personalized many other ways for many other types of events, occasions, or uses.

From stage 410 where the set of designs is selected for the delivery payment coding, exemplary method 400 advances to stage 415 where an appropriate fee is calculated. In addition to personalized images, users may wish to include on the personalized delivery payment coding the delivery rate desired. For example, in the case where the personalized delivery payment coding comprises a postage stamp, user 202 may wish to include postal card rate, first class rate, express mail, priority mail, or international mail, on the personalized delivery payment coding.

Personalized delivery payment coding system 200 may contain defined pre-designed images, and will be capable of maintenance to add additional images, reflect increased costs, and delivery rate changes. Because the delivery system operator may develop additional images, the user may have an increasingly better selection of choices. Over time, this may change the costs.

Given the example of a postage stamp, user 202 may select the amount of postage for which user 202 wishes to purchase. User 202 may, for example, select first class, postal card, priority mail, express mail, international mail or other mail rates. On the same sheet of stamps, a user may download different images with different denominations. For example, user 202 may just want one express mail stamp, and not need 20 of them. Or, user 202 may need one priority stamp but need two postal cards and eight first class postage stamps.

After the appropriate fee is calculated in stage 415, exemplary method 400 continues to stage 420 where the appropriate fee is paid. In the context of this method, the personalized delivery payment coding may be considered a product line rather than, for example, postage stamp. With a product line, the services and expenses can be surcharged to user 202, but a postage stamp may, according to some regulations, be sold only at face value. Thus, the services associated with the personalized delivery payment coding may not be covered with, for example, regular stamp costs nor may be permitted with current stamp regulations. So the personalized delivery payment coding may be considered a product or product line, rather than, for example, a postage stamp.

If the delivery system operator, for example, charges $14.95, this may be acceptable for 20 first class stamps at the current rate, but if there are rate changes, that same cost may have to be changed due to the baseline cost of the denominations of the stamps. In addition to being serviceable, personalized delivery payment coding system 200 may account for the number and face value of the personalized delivery payment coding purchased so that the delivery system operator will know exactly what to charge, and user 202 will know what exactly has been spent.

Once the appropriate fee is paid in stage 415, exemplary method 300 advances to stage 425 where a selected design is printed on delivery payment coding product paper.

The delivery payment coding product paper used for printing the personalized postage may be supplied by the delivery system operator because it may need to be processed by, for example, processing equipment operated by the delivery system operator, and be resistant to forgery. For example, the sheets used for delivery payment coding product paper may comprise the 8½ by 11 standard size just like conventional personal computer desktop printer paper. The 8½ by 11 sheets may be designed into two portions or a single portion so that the layout of the sheet may be, for example, two groups of 10 stamps or one group of 20 stamps set at the middle of the cut line so that die cut strains can be separated into two sheets (or if it is not separated, it's actually an 8½ by 11 sheet). This may be done because user 202 may only want to create half of a sheet with, for example, 10 stamps only. The delivery system operator may pre-die cut the sheets with a perforation of die cuts. The delivery payment coding product paper may fit tightly in a conventional printer so the pulsation of an image being introduced during printing will not move the image out of the pre-die cut window area.

There may be a blank space area on a sheet of delivery payment coding product paper that is called the header or ledger area. This areas may also be printed with user 202 selected designs. For example, user 202 can design an image or an inscription of the purpose of this sheet of stamps, for example, or customize these areas for a philatelic purpose, a souvenir sheet, for commemoration of an event, or similar purpose. These areas may have inscriptions of information or detail regarding the personalized delivery payment coding itself. The inscription may be changeable and may be printed on the delivery payment coding product paper during the printing process.

High-speed item processing or sorting equipment may use phosphor as a luminous tagging device to detect delivery payment coding. The paper used for the personalized delivery payment coding may be pre-phosphor paper comprising approximately 200 pmu, +/−10 pmu. If the phosphor is on the paper before printing, the paper could be used as delivery payment coding without any printing on it, and high-speed item processing or sorting equipment may detect it as postage. Additionally, non-stamp areas of the paper, such as the header or ledger areas, if it is pre-phosphored, may be luminescent and tagged so that it may be cut off and used as postage because the high-speed item processing or sorting equipment may not detect a difference between, for example, the stamp area and the header or ledger area. To address this concern, the printing or process finishing of the personalized delivery payment coding may tag image areas with phosphor. This will ensure that the high-speed item processing or sorting equipment will properly process the personalized delivery payment coding and, at the same time, counterfeit personalized delivery payment codings may not be processed.

As additional security against counterfeiting, the paper used for printing the personalized delivery payment coding may be imbedded with security threads or tape strips similar to the strips used in paper currency with the words, for example, "USPS," "e-postage," or "USPS e-post" or the like continuously printed on a tape or thread. The location of the tape could be a 0.100 of an inch above the image area in the lower bottom of it.

As a further security measure, the personalized delivery payment coding may have a continuous line of microprint of words, for example, "USPS e-post" or the like on the top of the image area approximately 0.100 inch below the top of the image area. The microprints appear just like a line, but through a microscope, the printing can be seen.

By having the microprinting on the personalized delivery payment coding, a two-stage control is in place to protect against forgery. The personalized delivery payment coding system 200 may print the microprinting on the paper and the threads may be pre-imbedded into the paper. Without both features, the personalized stamp product may not be required as legitimate delivery payment coding.

Sheets of delivery payment coding product paper may be packed in 25, 50, 100, and 500 sheet packages. These sheets may be individually numbered for accountability with a sheet accountability serial number. A licensee or user 202 may be responsible for matching sales records of the sheets with any returned spoiled sheets. There may be two records kept. If the delivery system operator sold a licensee some sheets, and if the licensee or user 202 printed it improperly, the licensee or user 202 could return that sheet to the delivery system operator intact and, as far as there is a record generated, such sheets would be accounted for. Accounting of how many sheets were used or spoiled may be built into the personalized delivery payment coding system 200. This may allow the delivery system operator to have full control of the sheets. When the delivery system operator ships the sheets, the delivery system operator may have a record of accountability from serial numbers of each sheet. This is done for the benefit of control and to protect against forgery The printing capability of printers used to print the personalized delivery payment coding may be up to 600 dpi or Parker value 1.0 to 2.0. 600 dpi requires much higher resolution from a printer in order to achieve success. Otherwise, it could result in a poor printing and the personalized delivery payment coding would lose its integrity. The Parker value is a technical term referring to the smoothness of the paper. The delivery payment coding product paper may be gummed though means of a water-activated adhesive or may include pressure sensitive adhesive laminated construction.

A facility or licensee where the personalized delivery payment coding is processed and finished may have equipment to process and use photo and/or design images and to print by electronic device with high quality outputs. The process and the printing capability may be about 400 lpi (lines per inch) for clear microprints layout on each personalized delivery payment coding produced.

From stage 425 where the selected design is printed on delivery payment coding product paper, exemplary method 400 ends at stage 430.

As shown in FIGS. 5 through 8, a user, for example, a USPS customer, may have the ability to obtain delivery payment coding from a delivery system operator, for example, the USPS, in several ways depending on different embodiments of the invention.

Figure 5:
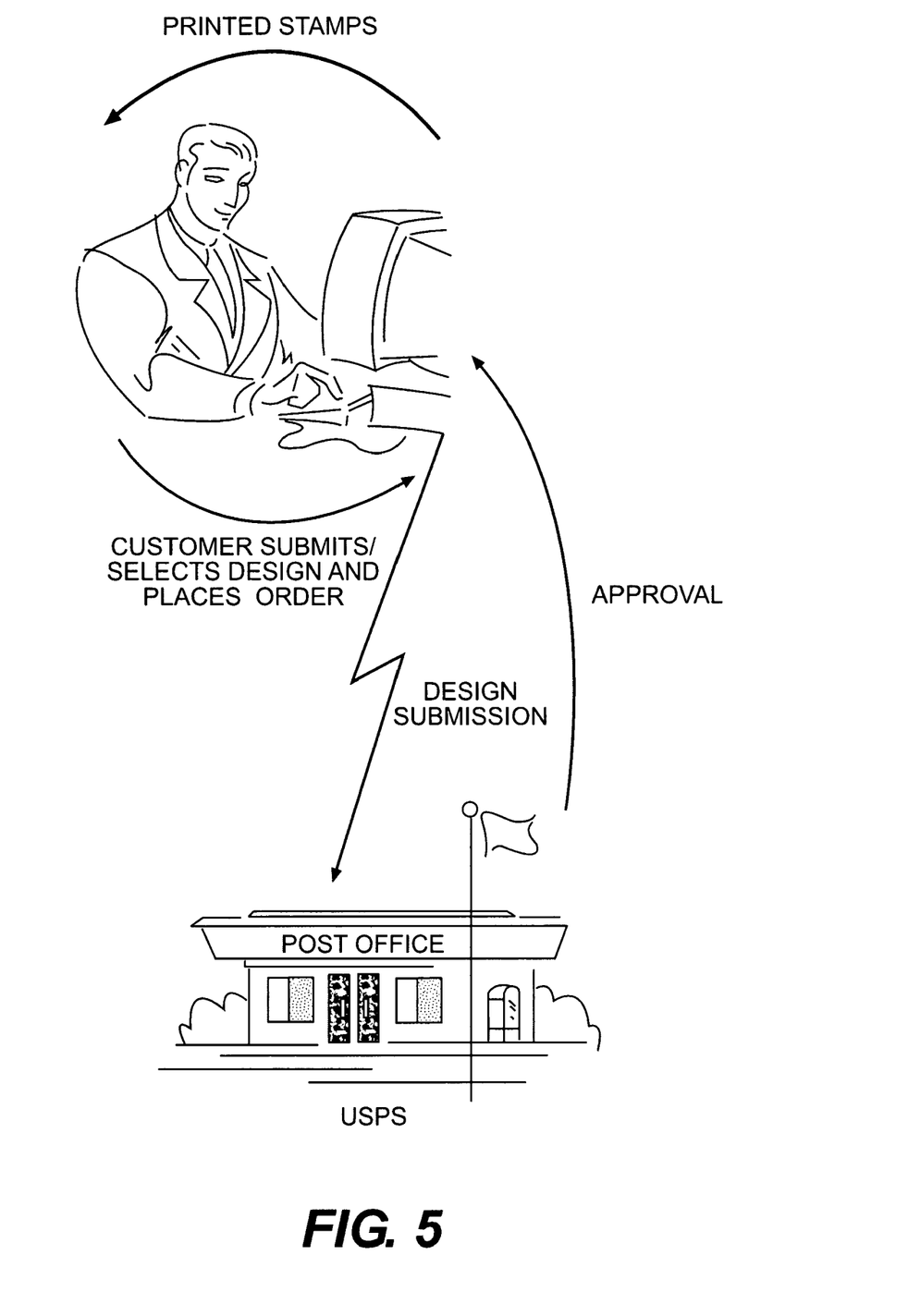
FIG. 5 is an illustration of a first exemplary embodiment consistent with the present invention.

In one embodiment, as shown in FIG. 5, the customer (user 202 for example) may electronically access (through network 215 for example) the USPS (at delivery system server 215 for example). This may be accomplished by programming modules on user computer 205. The customer may select, for example, the rate of postage and a pre-approved design or submit a design for approval on the customer's own personal computer such as user computer 205. The USPS can approve the design and electronically notify the customer of the approval. After approval, the customer may print the personalized delivery payment coding with the design with a printer associated with user computer 205.

Figure 6:
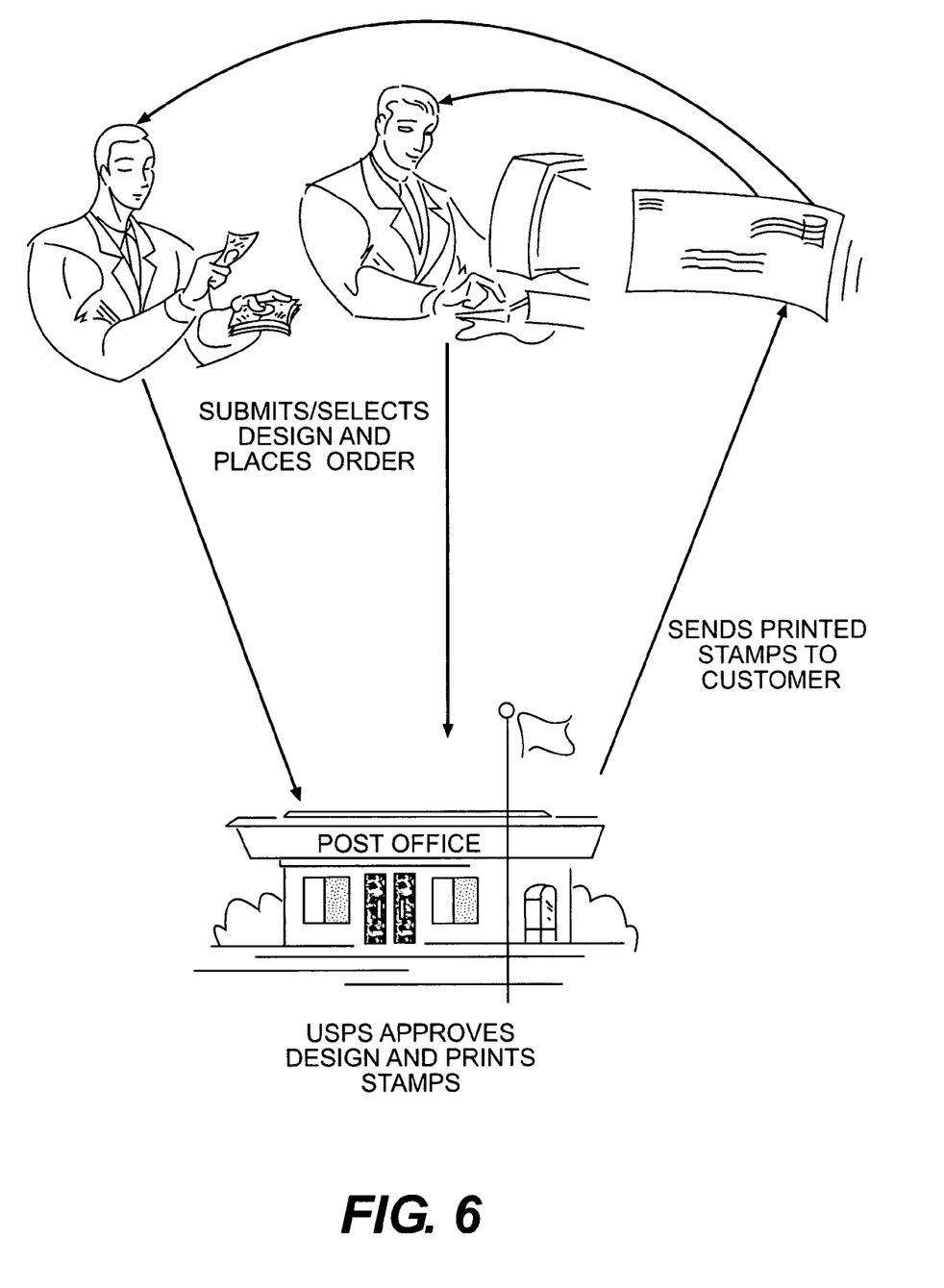
FIG. 6 is an illustration of a second exemplary embodiment consistent with the present invention.

In another embodiment, shown in FIG. 6, the USPS can operate through a centralized location. For example, a customer can send his or her photo, electronic file, or image to the USPS for approval, or simply notify the USPS which pre-approved design the customer wishes to have on the personalized delivery payment coding. The customer may order the quantity of the personalized delivery payment coding and may include postal class or rate the customer wishes. The USPS can print the personalized delivery payment coding and send it to the customer.

Figure 7:
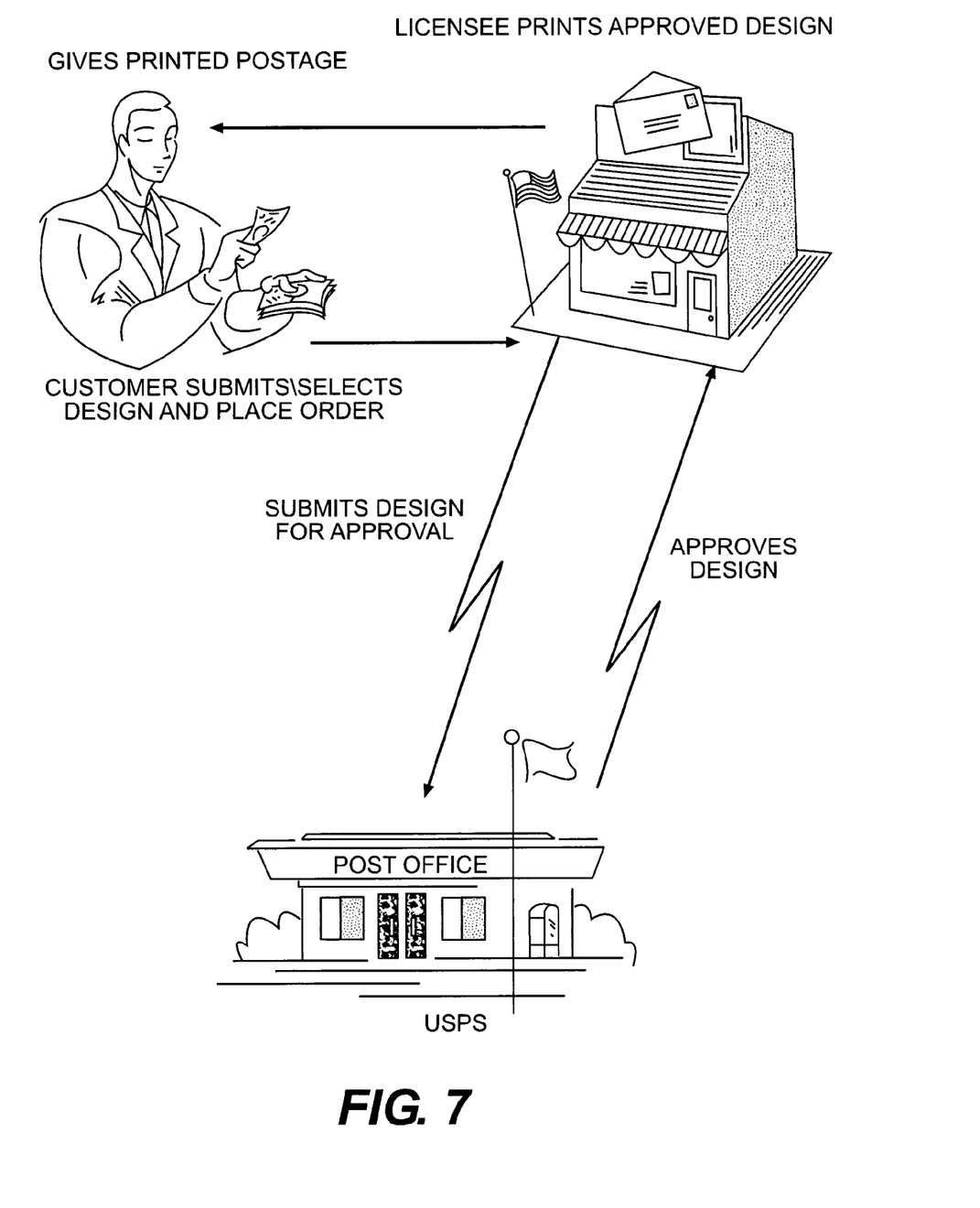
FIG. 7 is an illustration of a third exemplary embodiment consistent with the present invention.
Figure 8:
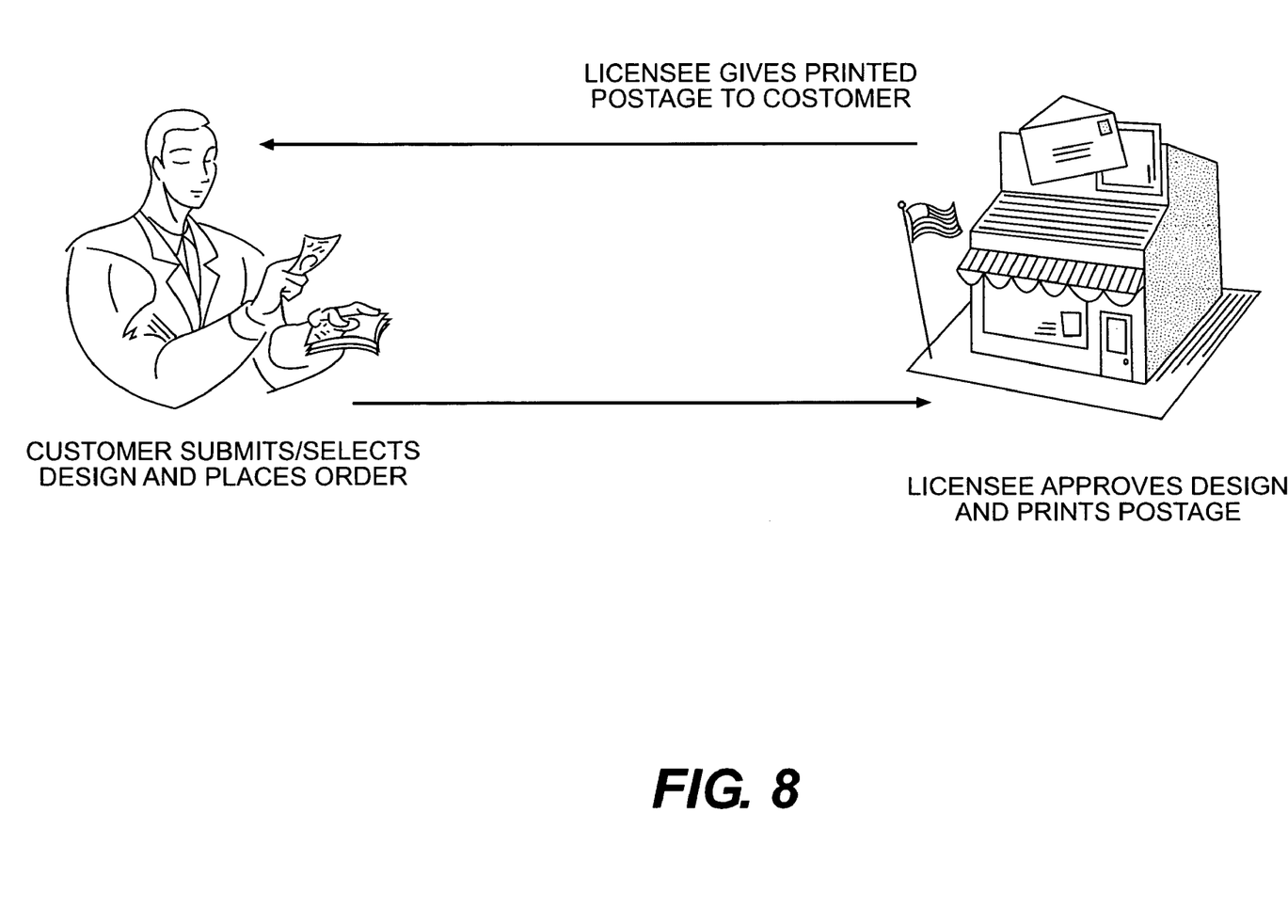
FIG. 8 is an illustration of a third exemplary embodiment consistent with the present invention.

In another embodiment, shown in FIGS. 7 and 8, the delivery system operator (the USPS, for example) may license the software to organizations or companies to provide customers a local outlet to obtain personalized delivery payment coding. The licensees may have access to software and printing equipment to print personalized delivery payment coding. The customer may order the personalized postage from the licensee and the licensee may be able to submit the personal designs to the USPS, as shown in FIG. 7, or will themselves be able to approve or disapprove the custom design in accordance to USPS guidelines and regulations as shown in FIG. 8. Once a design is properly approved, the licensee may print the personalized postage for the customer.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A computer-implemented method of creating a personalized delivery payment coding, comprising:
    performing, by a processor, operations comprising:
        receiving, from a user computer, an electronic indication of a first selected design for incorporation into a first personalized delivery payment coding;
        receiving, from the user computer, an electronic indication of a second selected design for incorporation into a second personalized delivery payment coding, wherein the second selected design differs from the first selected design;

calculating a fee based at least upon the first personalized delivery payment coding and the second personalized delivery payment coding;

receiving electronic payment information associated with the fee;

creating the first personalized delivery payment coding and the second personalized delivery payment coding, wherein the first personalized delivery payment coding incorporates the first selected design and the second personalized delivery payment coding incorporates the second selected design, and wherein the first delivery payment coding and the second delivery payment coding are configured for printing on a single page; and transmitting the first personalized delivery payment coding and the second personalized delivery payment coding to the user computer to enable printing of the first personalized delivery payment coding and the second personalized delivery payment coding.

2. The method of claim 1, wherein the processor further performs operations comprising:
receiving, from the user computer, an electronic indication of a selected denomination of delivery payment; and
incorporating the selected denomination of delivery payment into the first personalized delivery payment coding.

3. The method of claim 1, wherein the processor further performs operations comprising:
receiving, from the user computer, an electronic indication of a selected delivery payment rate class; and
incorporating the selected delivery payment rate class into the first personalized delivery payment coding.

4. The method of claim 1, further comprising:
mailing delivery payment coding product paper to the user for printing the first personalized delivery payment coding and the second personalized delivery payment coding.

5. The method of claim 1, wherein the delivery payment coding product paper comprises control markings.

6. The method of claim 5, wherein the control markings comprise serial numbers.

7. The method of claim 4, wherein the delivery payment coding product paper comprises a security thread.

8. A computer-implemented method of creating a personalized delivery payment coding, comprising the steps performed by a computer of:
transmitting, to a server, an electronic indication of a first selected design for incorporation into a first personalized delivery payment coding;
transmitting, to the server, an electronic indication of a second selected design for incorporation into a second personalized delivery payment coding, wherein the second selected design differs from the first selected design;
transmitting electronic payment information associated with the first personalized delivery payment coding and the second personalized delivery payment coding;
receiving, from the server, the first personalized payment coding and the second personalized payment coding; and
printing the first personalized delivery payment coding and the second personalized delivery payment coding on a single page.

9. The method of claim 8, further comprising the steps performed by the computer of:

transmitting, to the server, an electronic indication of a selected denomination of delivery payment; and
receiving, from the server, the personalized delivery payment coding, wherein the first personalized delivery payment coding incorporates the selected denomination of delivery payment.

10. The method of claim 8, further comprising the steps performed by the computer of:
transmitting, to the server, an electronic indication of a selected delivery payment rate class; and
receiving, from the server, the personalized delivery payment coding, wherein the first personalized delivery payment coding incorporates the selected delivery payment rate class.

11. The method of claim 8, further comprising:
printing the first personalized delivery payment coding and the second personalized delivery payment coding on delivery payment coding product paper.

12. The method of claim 11, wherein the delivery payment coding product paper comprises control markings.

13. The method of claim 12, wherein the control markings comprise serial numbers.

14. The method of claim 11, wherein the delivery payment coding product paper comprises a security thread.

15. A computer system for creating a personalized delivery payment coding, comprising:
a processor for executing instructions; and
a memory containing executable instructions that, when executed by the processor, cause the processor to perform operations comprising:
receiving, from a user computer, an electronic indication of a first selected design for incorporation into a first personalized delivery payment coding;
receiving, from the user computer, an electronic indication of a second selected design for incorporation into a second personalized delivery payment coding, wherein the second selected design differs from the first selected design;
calculating a fee based at least upon the first personalized delivery payment coding and the second personalized delivery payment coding;
receiving electronic payment information associated with the fee;
creating the first personalized delivery payment coding and the second personalized delivery payment coding, wherein the first personalized delivery payment coding incorporates the first selected design and the second personalized delivery payment coding incorporates the second selected design, and wherein the first delivery payment coding and the second delivery payment coding are configured for printing on a single page; and
transmitting the first personalized delivery payment coding and the second personalized delivery payment coding to the user computer to enable printing of the first personalized delivery payment coding and the second personalized delivery payment coding.

16. The system of claim 15, wherein the operations further comprise:
receiving, from the user computer, an electronic indication of a selected denomination of delivery payment; and
incorporating the selected denomination of delivery payment into the first personalized delivery payment coding.

17. The system of claim 15, wherein the operations further comprise:

receiving, from the user computer, an electronic indication of a selected delivery payment rate class; and incorporating the selected delivery payment rate class into the first personalized delivery payment coding.

18. A tangible computer-readable storage device storing a set of instructions that, when executed by a processor, cause the processor to perform operations comprising:

receiving, from a user computer, an electronic indication of a first selected design for incorporation into a first personalized delivery payment coding;

receiving, from the user computer, an electronic indication of a second selected design for incorporation into a second personalized delivery payment coding, wherein the second selected design differs from the first selected design;

calculating a fee based at least upon the first personalized delivery payment coding and the second personalized delivery payment coding;

receiving electronic payment information associated with the fee;

creating the first personalized delivery payment coding and the second personalized delivery payment coding, wherein the first personalized delivery payment coding incorporates the first selected design and the second personalized delivery payment coding incorporates the second selected design, and wherein the first delivery payment coding and the second delivery payment coding are configured for printing on a single page; and transmitting the first personalized delivery payment coding and the second personalized delivery payment coding to the user computer to enable printing of the first personalized delivery payment coding and the second personalized delivery payment coding.

19. The tangible computer-readable storage device of claim 18, wherein the operations further comprise:

receiving, from the user computer, an electronic indication of a selected denomination of delivery payment; and incorporating the selected denomination of delivery payment into the first personalized delivery payment coding.

20. The tangible computer-readable storage device of claim 18, wherein the operations further comprise:

receiving, from the user computer, an electronic indication of a selected delivery payment rate class; and incorporating the selected delivery payment rate class into the first personalized delivery payment coding.

21. The tangible computer-readable storage device of claim 18, wherein the operations further comprise:

mailing delivery payment coding product paper to the user for printing the personalized delivery payment coding.

* * * * *